US012715001B2

(12) United States Patent
Le Cras et al.

(10) Patent No.: US 12,715,001 B2
(45) Date of Patent: Aug. 25, 2026

(54) SYSTEM AND METHOD FOR MOUNTING A LINER ELEMENT TO A MILL SHELL OF A MILL

(71) Applicant: METSO FINLAND OY, Espoo (FI)

(72) Inventors: Jared Le Cras, Thornlie (AU); Nick Green, Oslo (NO); Bjorn Nielsen, Inglewood (AU)

(73) Assignee: Metso Finland Oy, Espoo (FI)

( * ) Notice: Subject to any disclaimer, the term of this patent is extended or adjusted under 35 U.S.C. 154(b) by 256 days.

(21) Appl. No.: 18/567,713

(22) PCT Filed: Jun. 9, 2022

(86) PCT No.: PCT/EP2022/065702
§ 371 (c)(1),
(2) Date: Dec. 6, 2023

(87) PCT Pub. No.: WO2022/268518
PCT Pub. Date: Dec. 29, 2022

(65) Prior Publication Data
US 2024/0269685 A1 Aug. 15, 2024

(30) Foreign Application Priority Data
Jun. 23, 2021 (EP) .................................... 21181262

(51) Int. Cl.
*B02C 17/22* (2006.01)
*B23P 19/04* (2006.01)
(Continued)

(52) U.S. Cl.
CPC .................................... *B02C 17/22* (2013.01)

(58) Field of Classification Search
CPC ........................ B02C 17/22; B02C 2013/2825
See application file for complete search history.

(56) References Cited

U.S. PATENT DOCUMENTS 3,655,227 A * 4/1972 Orloff ..................... F16B 19/05 411/959
2013/0140387 A1* 6/2013 Fernandez .............. B02C 17/22 241/300
(Continued)

FOREIGN PATENT DOCUMENTS

CL 2020001067 A1 6/2020
CN 202666927 U 1/2013
(Continued)

OTHER PUBLICATIONS

Rattle Hitch Pin Bolt with Keeper Grip Clip Kit, retrieved date Dec. 3, 2025. https://www.amazon.com/eVerHITCH-Trailer-Anti-Rattle-Stainless-Keeper/dp/B07JHQ36NX.*
(Continued)

*Primary Examiner* — Mohammed S. Alawadi
(74) *Attorney, Agent, or Firm* — Andrus Intellectual Property Law, LLP

(57) ABSTRACT

A system and method for mounting a liner element to a mill shell of a mill. The system includes one or more fastening bolts, and one or more associated liner interface guide elements each having a locking portion having a cross-sectional dimension larger than a cross-sectional dimension of a bolt body of the fastening bolts. Each fastening bolt and an associated liner interface guide element are structured and arranged to be attached to each other such that, when inserted into the liner element through-hole, the liner interface guide element, by means of the locking portion, locks the fastening bolt to the liner element and protrudes out from the back side thereof to define a guide portion. The guid portion is arranged to penetrate into an associated mill shell through-hole thereby guiding the liner element into a mounting position at which the liner element is in abutment with the mill shell.

3 Claims, 5 Drawing Sheets

Figure 1A:
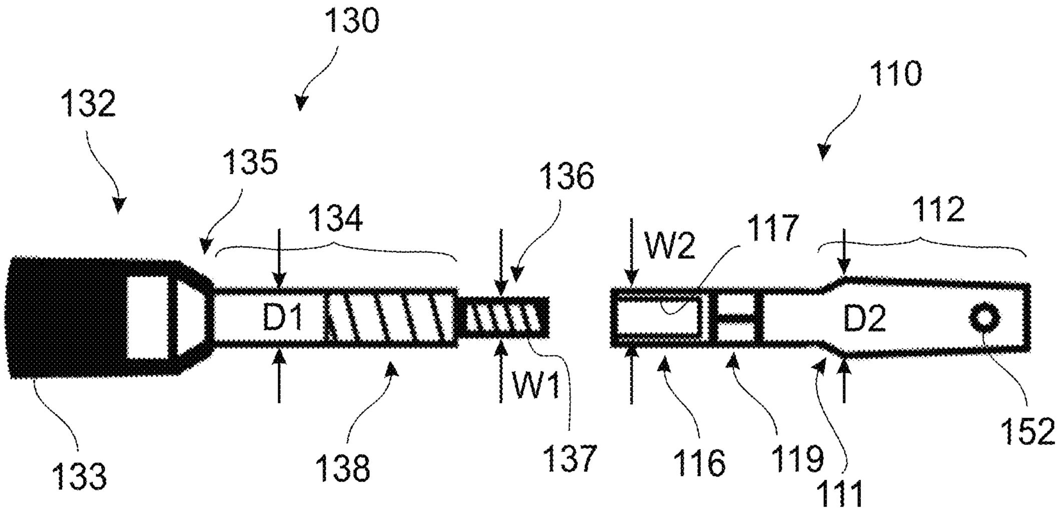

(51) Int. Cl.

| | |
|---|---|
| ***B24B 31/02*** | (2006.01) |
| ***B24B 31/12*** | (2006.01) |
| ***B24B 41/02*** | (2006.01) |

(56) References Cited

U.S. PATENT DOCUMENTS

| | | | | |
|---|---|---|---|---|
| 2014/0319256 | A1* | 10/2014 | Knight | B02C 17/18<br>241/182 |
| 2015/0028142 | A1* | 1/2015 | Coray | B02C 17/22<br>241/300 |
| 2015/0260217 | A1* | 9/2015 | Woods | F16B 19/008<br>29/505 |
| 2020/0061626 | A1* | 2/2020 | Waters | B02C 17/22 |
| 2020/0072273 | A1* | 3/2020 | Oldnall | F16B 35/06 |
| 2021/0129155 | A1* | 5/2021 | Rubie | F16B 23/0092 |

FOREIGN PATENT DOCUMENTS

| | | | |
|---|---|---|---|
| CN | 110131272 | A | 8/2019 |
| CN | 212509166 | U | 2/2021 |
| CN | 212915938 | U | 4/2021 |
| CN | 216633925 | U | 5/2022 |
| GB | 372405 | A | 5/1932 |
| WO | 2009008810 | A1 | 1/2009 |
| WO | 2018102863 | A1 | 6/2018 |
| WO | 2018157201 | A1 | 9/2018 |

OTHER PUBLICATIONS

Bolt Covers Screw Caps, retrieved date Dec. 3, 2025. https://www.amazon.com/Glarks-Assortment-Protection-Protecting-Hexagon/dp/B089ZZ9B34?th=1.*

Search Report and Examiner's Report for Chilean Patent Application No. 202303629, issued Jun. 2, 2025.

International Search Report and Written Opinion for PCT/EP2022/065702, dated Sep. 27, 2022.

International Preliminary Report on Patentability for PCT/EP2022/065702, dated Oct. 23, 2023.

Demand and Response to Written Opinion for PCT/EP2022/065702, dated Apr. 20, 2023.

Office action and search report for Chinese Patent Application No. 2021110322425, mailed Jan. 29, 2026.

* cited by examiner

SYSTEM AND METHOD FOR MOUNTING A LINER ELEMENT TO A MILL SHELL OF A MILL

CROSS-REFERENCE TO RELATED APPLICATIONS

This application is the U.S. national stage application of International Application PCT/EP2022/065702, filed Jun. 9, 2022, which international application was published on Dec. 29, 2022, as International Publication WO 2022/268518 A1 in the English language. The International Application claims priority European Patent Application No. 21181262.3 filed Jun. 23, 2021.

WO 2018/157201 A1 discloses a system for removing a liner from a mill and a tool for use in removing a liner from a mill. WO 2018/102863 A1 discloses a liner bolt comprising an elongate stud and a head engageable with a first end of the stud. WO 2009/008810 A1 discloses an arrangement for the joining and attachment of a wear lining element onto a surface that is subject to wear.

FIELD OF THE DISCLOSURE

The present disclosure relates to a system and a method for mounting a liner element to a mill shell of a mill, such as a tumbling mill.

BACKGROUND ART

Liner elements for mills, such as tumbling mills, often have dedicated lifting points for placement on the mill wall using a mill reline machine grapple. However, these lifting points are destroyed during mill operation. Consequently, spent liners must be 'knocked-in', a process where the liners are dislodged from the wall using a bolt hammer or similar tool and land on the mill charge below. Traditional lifting techniques are then used to pick up and remove the spent liners from the mill. These traditional lifting techniques require trained personnel to work alongside the mill reline machine to install lifting equipment, attach this equipment to the mill reline machine lifting points and finally, guide the load during the lifting process. To reduce the overall need for personnel, and thus provide a more efficient relining, there is a need for an improved method and system for allowing mill reline machines to use their grapple to both place new liners and remove spent liners directly from the mill wall with no assistance from personnel inside the mill.

SUMMARY

It is an object to mitigate, alleviate or eliminate one or more of the above-identified deficiencies in the art and disadvantages singly or in any combination. These and other objects are at least partly met by the invention as defined in the independent claims. Preferred embodiments are set out in the dependent claims.

According to a first aspect there is provided a system for mounting a liner element to a mill shell of a mill, said liner element having a back side arranged to face the mill shell and a front side arranged to face an interior of the mill, when mounted on the mill shell, the system comprising:

one or more fastening bolts each having a bolt head and a bolt body extending from the bolt head, each fastening bolt being structured and arranged to be inserted into an associated liner element through-hole from the front side thereof and to be secured from outside the mill shell using an associated fastener; and one or more associated liner interface guide elements each having a locking portion having a cross-sectional dimension being larger than a cross-sectional dimension of the bolt body of the one or more fastening bolts; and wherein each fastening bolt and an associated liner interface guide element are structured and arranged to be attached to each other such that, when inserted into said associated liner element through-hole, said associated liner interface guide element, by means of the locking portion, locks the fastening bolt to the liner element and protrudes out from the back side thereof to define a guide portion which, during mounting of the liner element on the mill shell, is arranged to penetrate into an associated mill shell through-hole thereby guiding the liner element into a mounting position at which the liner element is in abutment with the mill shell, and at which mounting position the guide portion at least partly protrudes out from the mill shell on an outside thereof so as to present an externally accessible engagement portion.

The system may be advantageous as it allows mounting new liner elements as well as removing worn our liner elements using a mill reline machine without the need for personnel being present within the mill. The unassisted pick up of liners directly from the mill wall provided by the present inventive concept is an important step in making mill relining more efficient and promotes greater autonomy for the relining process. Identifying and utilizing an interface on both new and spent liners is the key step in achieving unassisted relining. The system of the disclosure may provide this interface by utilizing the bolt heads as lifting portions. Once the liner element has been mounted in its intended position, the one or more liner interface guide elements can be detached from its respective fastening bolt and re-used for other liner elements. A further advantage of the system is that the one or more liner interface guide elements provide guiding portions for facilitating the mounting process. The guide portions engage with the mill shell through-holes to guide the liner elements into its correct position, i.e. the mounting position. A further advantage of the system is that, once the liner element has been mounted in its mounting position, the guide portions at least partly protrude outside of the mill shell. Parts of the guide portions are therefore made accessible from the outside and may be engaged e.g. by personnel to correctly position the fastening bolts in the liner element through-holes and also facilitates easy removal of the liner interface guide elements from the fastening bolts to which they are attached. A yet further benefit of the system is that it effectively removes the need for using customised reline jigs. The reline machine grapple may be structured and arranged to engage with the lifting portions directly using a single grapple design applicable for both mounting and demounting the liner element to the mill shell.

Each fastening bolt and its associated liner interface guide element are structured and arranged to be attached to each other so as to form a common linearly extending structure. This implies that, when attached to each other, the fastening bolt and its associated liner interface guide element both extend along a common axis, namely the axis aligned along a longitudinal extension of the liner element through-hole. The locking portion of the liner interface guide element has the same basic functionality as the bolt head of the fastening bolt, namely, to engage with the liner element to prevent further movement into the liner element through-hole. This implies that the liner interface guide element and the fastening bolt attached thereto does not have to be rigidly attached to the liner element. The locking functionality of the inventive concept may thus allow certain movement within the liner element through-hole. This implies that the fastening bolts are displacably coupled to the liner element. This have the advantage that, once the liner interface guide element has been released from its associated fastening bolt, each of said items are removable from the liner element without the need to exert any force, such as is needed for alternative solutions where the elements are driven into a locking, or retaining, engagement with the liner element by use of force.

The fastener may be a fastening element, such as a fastening nut. Alternatively, it may be another kind of fastening element such as a snap fit fastener.

According to some embodiments, the system further comprises locking means arranged to engage with the mill shell and said externally accessible engagement portions for allowing temporarily locking the liner element to the mill shell prior to securing the liner element using said one or more fastening bolts and their associated fasteners.

The locking means allowing to temporarily lock the liner with respect to the mill shell may be advantageous as it may prevent a liner element from accidentally falling down during mounting. The locking means thus provide an extra security during the mounting process. However, the locking engagement achieved by the locking means should not be construed as a fixed attachment which forces the liner element to stay in the mounting position at all times. Due to the geometry of the fastening bolts and their associated liner interface guide elements, the liner element may leave the mounting position to be displaced a certain distance into the interior of the mill, until, being prevented from further displacement by the locking means.

According to some embodiments, the locking means is defined by a locking through-hole formed in each engagement portion, and an associated locking element arranged to be received in said locking through-hole. The locking through-hole and locking element is a relatively simple way to achieve the temporary locking of the liner element with respect to the mill shell. A locking element may be a simple straight pin or bolt with a head. The locking element may alternatively be at least partly curved. One such locking element is sometimes called Beta Pins or R-Clips due to their R form. These locking elements may be advantageous as they are shaped to clamp the element to which they are pinned, thereby reducing the risk that they accidentally move out of position and leaves the liner interface guide element. As readily appreciated by the person skilled in the art, there are many alternative locking means known in the art which could be used to act instead of the locking element and the through-hole.

According to some embodiments, the guide portion of each liner interface guide element is at least partly tapered. This may be advantageous as it facilitates entering the mill shell through-holes with the guide elements during mounting of the liner element.

According to some embodiments, each fastening bolt and its associated liner interface guide element are attachable to each other by means of threaded engagement. The threaded engagement is a preferred fastening means as it is reliable.

According to some embodiments, each fastening bolt comprises a liner interface guide element attachment portion at an end of the bolt body for providing said threaded engagement, and a fastener attachment portion for engagement with the fastener. Using separate attachment portions for the fasteners and for the liner interface guide elements may have several advantages. Firstly, it allows using fastener attachment portions which fills the maximum available through-hole diameter, which is beneficial as it aids in providing a stronger mount of the liner element and reduces the risk of the liner element moving sideways due to a large bolt clearance. Secondly, it allows tailoring the properties of the threaded engagement to the specific need at hand. The mechanical strain exerted on the fastener attachment portion during mill operation may be vastly different from the mechanical strain exerted on the liner interface guide element attachment portion during mounting and removal of liner elements. Another advantage is that it allows less geometrical constraints for the liner interface guide elements.

According to some embodiments, the liner interface guide element attachment portion comprises a male thread and wherein the associated liner interface guide element comprises a female thread arranged to be received in the male thread. This implies that the fastener attachment portion may be disposed in between the bolt head and the liner interface guide element attachment portion. The opposite geometry is however also conceivable. In other words, the liner interface guide element attachment portion may comprise a female thread and wherein the associated liner interface guide element may comprise a male thread arranged to be received in the female thread. This implies that the fastener attachment portion may be disposed at the same axial position as the liner interface guide element attachment portion. The fastener attachment portion may be a male thread defined at an outside of the fastening bolt whereas the liner interface guide element attachment portion may be defined by a female thread formed within an interior of the fastening bolt.

According to some embodiments, a cross-sectional dimension of the liner interface guide element attachment portion is smaller than a cross-sectional dimension of the bolt body, and wherein a cross-sectional dimension of the threaded attachment portion is substantially equal to a cross-sectional dimension of the bolt body. This may be advantageous as it allows the shape that together is defined by the fastening bolt and the liner interface guide element to have substantially the same cross section in an intermediate region thereof, thus preventing accidental jams and facilitates an easy displacement of the fastening bolt and its associated attached liner interface guide element between different positions within the liner element through-hole.

According to some embodiments, the bolt head of each fastening bolt comprises an outer wear plug structured and arranged to prevent material from entering the associated liner interface through-hole during use of the mill. The outer wear plug may be advantageous as it fills the entrance opening of the liner element through-hole during mill operation thereby reducing the likelihood of ore and balls lodging in the through-hole. The outer wear plug may be dimensioned to the expected thickness of the liner when it is replaced. The outer wear plug may be made from a resilient wear-resistant material such as rubber or polyurethane. The outer wear plug may be structured and arranged to completely fill the opening of the liner element through hole on the front side of the liner element when attached. This may reduce the risk of material getting stuck in recesses otherwise formed at such openings. It may also prevent damage, such as by peeling, to the openings due to wear during operation.

According to some embodiments, the system further comprises one or more collars each structured and arranged to be disposed around the bolt body of the fastening bolt inside the mill shell through-hole. The collars may be advantageous as they increase overall stability of the mount by compensating for the mill shell through-holes being larger than the liner element through-holes, a requirement for using the system of the inventive concept, since the liner interface guide elements would otherwise not fit inside the mill shell through-holes.

According to a second aspect there is provided a liner assembly for a mill comprising:

a system according to the first aspect; and a liner element having a back side arranged to face the mill shell and a front side arranged to face an interior of the mill, when mounted on the mill shell, wherein the liner element comprises one or more liner element through-holes each extending from the back side to the front side and comprising a respective waist portion which presents said minimum cross-sectional dimension of the liner element through-hole.

According to some embodiments, the waist portion is disposed in vicinity of the back side of the liner element and the part of the liner element through-hole extending from the waist portion to the front side is tapered. This may be advantageous as it makes it easier to knock the fastening bolt free from the liner element during a removal thereof.

A mill may also be provided, said mill comprising a mill shell presenting a plurality of mill shell through-holes for allowing mounting a plurality of liner elements on an inside thereof; and at least one liner assembly according to the third aspect;

wherein a cross-sectional dimension of each of the mill shell through-holes are larger than the cross-sectional dimension of the locking portion of each liner interface guide element of said system.

According to a third aspect there is provided a method for mounting a liner element to a mill shell of a mill, said liner element having a back side arranged to face the mill shell when mounted, and a front side arranged to face an interior of the mill, the method comprising:

a) inserting one or more fastening bolts into associated liner element through-holes of the liner element from the front side thereof, each fastening bolt having a bolt head and a bolt body extending out from the bolt head;

b) to each of said one or more fastening bolts, attaching an associated liner interface guide element having a locking portion having a maximum cross-sectional dimension being larger than a cross-sectional dimension of the bolt body of the one or more fastening bolts such that said associated liner interface guide element locks the fastening bolt to the liner element and protrude out from the back side of the liner element to define an associated guide portion;

c) lifting by means of a lifting tool the liner element into a position with respect to the mill shell at which the one or more liner interface guide elements axially coincide with one or more associated mill shell through-holes;

d) displacing by means of the lifting tool the liner element into a mounting position at which the liner element is in abutment with the mill shell by allowing said associated guide portions to penetrate into said one or more associated mill shell through-holes, thereby guiding the liner element into said mounting position, and at which mounting position each guide portion at least partly protrude out from the mill shell on the outside thereof so as to present an externally accessible engagement portion;

e) displacing, by engaging said engagement portion, each liner interface guide element and its associated fastening bolt with respect to the liner element to a fastening position at which the bolt head engages with the liner element;

f) removing each of the one or more liner interface guide elements from its associated fastening bolt;

g) securing each fastening bolt from outside the mill shell using an associated fastener.

According to some embodiments, the method further comprises arranging said one or more fastening bolts and their associated one or more liner interface guide elements attached thereto such that their bolt heads protrudes out from the front side of the liner element to define lifting portions, and lifting the liner element by engaging the lifting tool with said lifting portions.

According to some embodiments, the method further comprises temporarily locking the liner element to the mill shell by activating locking means which provides an engagement between the engagement portions and the mill shell prior to securing the liner element using said associated fasteners.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The disclosure will by way of example be described in more detail with reference to the appended drawings, which shows presently preferred embodiments of the disclosure.

Figure 1B:
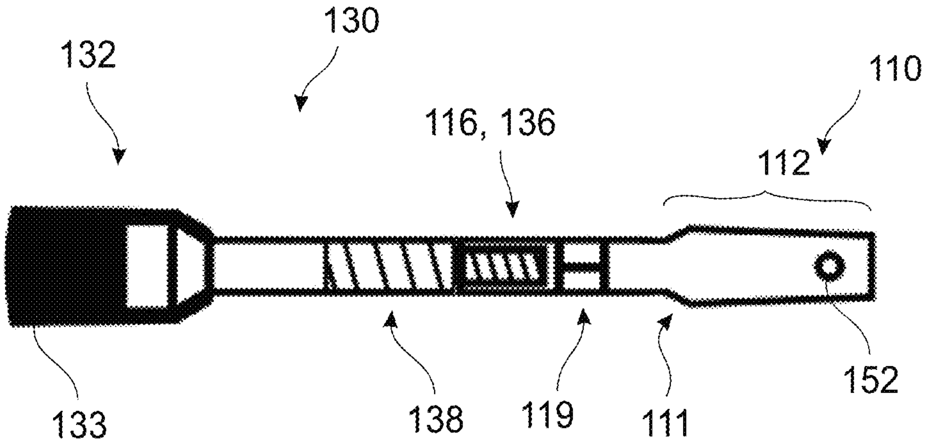

FIGS. 1A and B shows a cross-sectional side view of a fastening bolt and a liner interface guide element according to an embodiment of the disclosure. In FIG. 1A the two elements are not attached to each other, whereas FIG. 1B illustrates the same elements attached to each other.

Figure 2A:
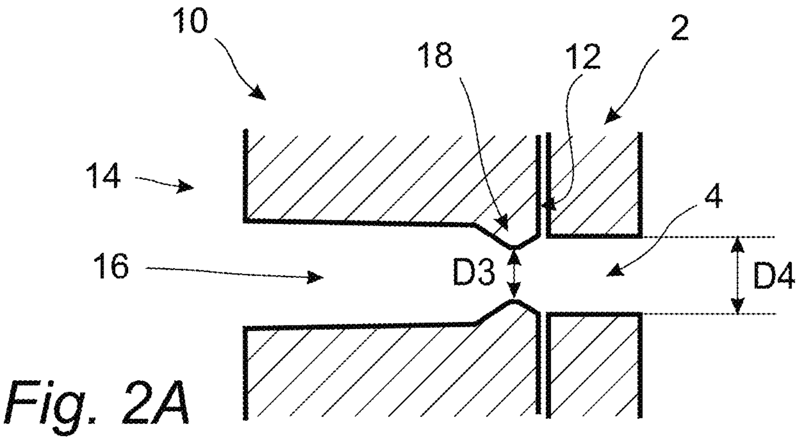
Figure 2B:
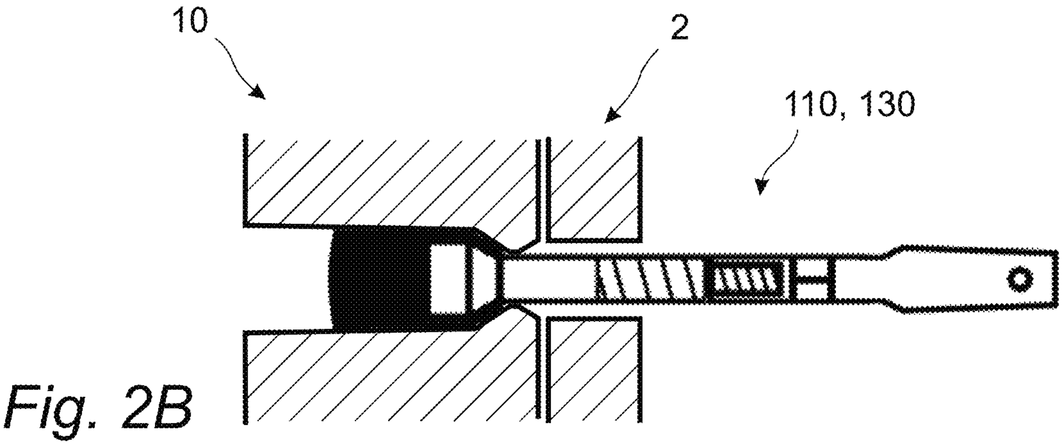

FIG. 2A shows a cross-sectional side view of a part of a liner element and its liner element through-hole when arranged in a mounting position in relation to the mill shell according to an embodiment of the disclosure. FIGS. 2B and C shows cross-sectional side views of the fastening bolt and the liner interface guide element of FIG. 1 in different end positions within the liner element through-hole of FIG. 2A according to an embodiment of the disclosure.

FIGS. 3A-F illustrates the different steps in a method for mounting a liner element on a mill shell according to an embodiment of the present disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person.

Tumbling mills comprises large rotary grinding drums into which material to be grinded are input. As a result from abrasive as well as impact wear, the walls of the drum, herein referred to as the mill shell, needs to be equipped with a wear resistant lining. Such lining often comprises a plurality of liner elements which are mounted together to form a single inner wear surface interacting with the material in the interior of the mill. Once the lining is worn out, it will need to be replaced. For this purpose, mill reline machines are typically used to replace one or more liner elements. The present inventive concept has been developed to meet requirements in this area. The inventive concept relates to a system and a method for mounting a liner element to a mill shell of a mill, such as a tumbling mill. Before describing the method, the different parts of the system will be described in detail with reference to FIG. 1.

FIG. 1 shows to the left a fastening bolt 130. The fastening bolt 130 is structured and arranged to be inserted into an associated liner element through-hole 16 of a liner element 10 from the front side 14 thereof and to be secured from outside the mill shell 2 using an associated fastener, fastening bolt 140. This will be described later with reference to FIG. 2. As best illustrated in FIG. 1, the fastening bolt 130 has a bolt head 132 and a bolt body 134 extending from the bolt head 132. The bolt head 132 has a rotationally asymmetric cross section (not shown) structured and arranged to fit into complementary shaped liner element through-holes 16 of the liner element 10. Such bolt heads having rotationally asymmetric cross sections are well known in the art and are used to prevent the bolts from rotating in relation to the through-holes when engaging and rotating a fastening means, such as a fastener mounted thereon. The bolt head 132 further present a frustoconical rim 135 which is arranged to press a waist portion 18 of the liner element 10 towards the mill shell 2, as will be described in more detail later. The bolt head 132 further comprises an outer wear plug 133 structured and arranged to prevent material from entering the associated liner interface through-hole 16 during use of the mill. The outer wear plug 133 is at least partly tapered for facilitating removal of the fastening bolt 130 from a used liner element. The outer wear plug 133 may be made from a resilient wear-resistant material such as rubber or polyurethane. Although not shown in FIGS. 3A-F, the outer wear plug may alternatively be structured and arranged to completely fill the opening of the liner element through hole on the front side of the liner element when attached. This may reduce the risk of material getting stuck in recesses formed at such openings. It may also prevent damage, such as by peeling, to the openings due to wear during operation. The fastening bolt 130 further comprises two separate threaded attachment portions: a fastener attachment portion 138, and a liner interface guide element attachment portion 136. As can be seen in FIG. 1A, the liner interface guide element attachment portion 136 is disposed at the end of the bolt body 134 and has a cross-sectional dimension W1 being smaller than a cross-sectional dimension D1 of the bolt body 134 disposed adjacent thereto. For the example embodiment, both the liner interface guide element attachment portion 136 and the fastener attachment portion 138 presents male threads. However, as readily appreciated by the person skilled in the art, it is also conceivable with the inverted geometry, i.e. providing the fastening bolt 130 with a female thread and the liner interface guide element 110 with a male thread.

Also illustrated in FIG. 1A but to the right is a liner interface guide element 110 according to an example embodiment. The liner interface guide element 110 has an elongated extension and presents at one end thereof a guide portion 112 and at another end thereof a threaded attachment portion 116. The cross-sectional dimension W2 of the threaded attachment portion 116 is substantially the same as the cross-sectional dimension D1 of the bolt body 134 except for the guide portion 112 which has a larger cross-sectional dimension. The maximum cross-sectional dimension D2 of the liner interface guide element 110 is located where the guide portion 112 starts and defines a locking portion 111. The relevance of the locking portion 111 and its dimensions will be explained later. The liner interface guide element 110 further comprises a tool-connecting portion 119 disposed between the threaded attachment portion 116 and the guide portion 112. The purpose of the tool-connecting portion 119 is to facilitate engagement with a tool, such as a wrench or spanner, to rotate the liner interface guide element 110 during an attachment or detachment thereof. The tool-connecting portion 119 may be embodied in different ways. For example, it may be embodied by one or more machined flats in its outer circumferential surface. A preferred embodiment is to machine six flats so as to provide a tool-connecting portion 119 having a hexagonal cross section. A locking through-hole 152 is presented in the guide portion 112 of the liner interface guide element 110 at the outer end thereof. The functionality of the locking through-hole 152 will be described later.

The fastening bolt 130 and an associated liner interface guide element 110 are structured and arranged to be attached to each other, thereby forming a common elongated element. This is illustrated in FIG. 1B. The attachment is obtained by engaging the liner interface guide element attachment portion 136 of the fastening bolts 130 with the threaded attachment portion 116 of the liner interface guide element 110. In the example embodiment, the liner interface guide element attachment portion 136 comprises a male thread 137 and the associated liner interface guide element 110 comprises a female thread 117 arranged to be received in the male thread 137. The female thread 137 is disposed within the threaded attachment portion 116. As can be seen in FIG. 1B, a cross-sectional dimension W2 of the threaded attachment portion 116 of the liner interface guide element 110 is substantially equal to a cross-sectional dimension D1 of the bolt body 134. However, it is clear that the locking portion 111 has a maximum cross-sectional dimension D2 being larger than a cross-sectional dimension D1 of the bolt body 134 of the one or more fastening bolts 130.

Figure 2C:
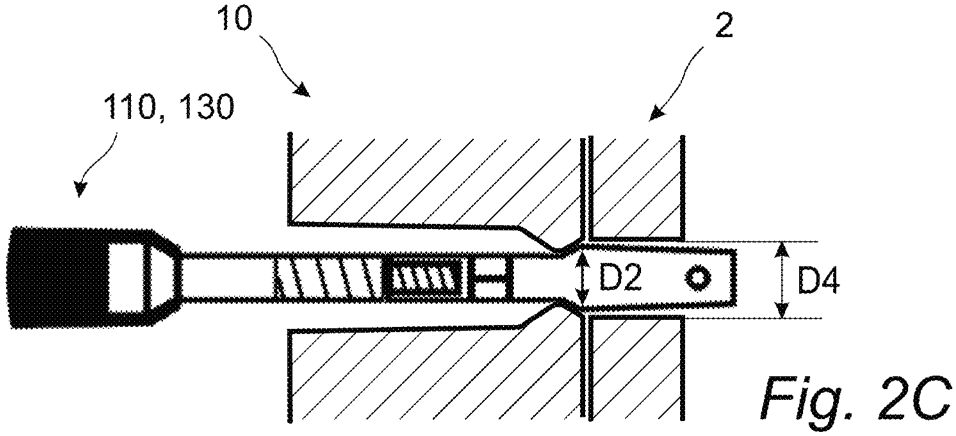

Turning now to FIG. 2A-C, the fastening bolt 130 and the liner interface guide element 110 when attached to each other will be illustrated together with the geometry of the liner element through-hole 16 and the mill shell through-hole 4, respectively. As can be seen in FIG. 2A, the liner element through-hole 16 extends from the back side 12 to the front side 14 of the liner element 10 and comprises a waist portion 18 which presents a minimum cross-sectional dimension D3 of the liner element through-hole 16. The waist portion 18 is disposed in vicinity of the back side 12 of the liner element 10 and the part of the liner element through-hole 16 which extends from the waist portion 18 to the front side 14 is tapered. To the right-hand side in FIG. 2A a portion of the mill shell 2 is illustrated in cross sectional view to illustrate a mill shell through-hole 4. In FIG. 2A, the liner element 10 is located in relation to the mill shell 2 such that the liner element through-hole 16 axially coincide with the mill shell through-hole 4 and the liner element 10 is in abutment with the mill shell 2. This is referred to herein as the mounting position and is the position at which the liner element 10 will be located when fastened and subsequently used during operation of the mill. As can be seen in FIG. 2A, the cross-sectional dimension D4 of the mill shell through-hole 4 is larger than the minimum cross-sectional dimension D3 of the liner element through-hole 16, i.e. the minimum cross-sectional dimension D3 of the waist portion 18. This is an important prerequisite for using the system and method of the inventive concept, as will be understood in what follows.

FIGS. 2B and C illustrates the same cross-sectional view of the through-holes 4, 16 as FIG. 2A, but here the fastening bolt 130 and the liner interface guide element 110 attached thereto are illustrated in their intended positions inside the through-holes 4, 16. Focusing now primarily on geometry, leaving the functionality to later, it can be clearly seen in FIG. 2B at a first end position, the frustoconical rim 135 of the bolt head 132 engages with the complementary shaped waist portion 18 of the liner element through-hole 16, thus effectively preventing further movement of the fastening bolt 130 in the direction towards the mill shell 2. Turning to FIG. 2C, it can be clearly seen that at a second end position, the locking portion 111 of the liner interface guide element 110 engages with the waist portion 18 from the other direction, thus effectively preventing further movement in the direction away from the mill shell 2. Thus, the geometry is such that, once attached to each other when at least one of them has been arranged inside a liner element through-hole 16, the fastening bolt 130 and the liner interface guide element 110 attached thereto cannot leave the liner element 10 and are thus locked thereto. This implies that at neither end position they will be fixedly, or rigidly, attached to the liner element 10, such as could be achieved by driving the elements into a jamming engagement with the liner element. At all times, they are displacably coupled thereto. They may however not leave the liner element 10, i.e. they are locked with respect to the liner element 10. The only way to remove the fastening bolt 130 and/or the liner interface guide element 110, is to separate them from each other and remove them separately from the front side 14, and the back side 12, respectively. FIG. 2C also clearly illustrates that the cross-sectional dimension D4 of the mill shell through-hole 4 is larger than the maximum cross-sectional dimension D2 of the locking portion 111 of the liner interface guide element 110. This allows for introducing the liner interface guide element 110 through the mill shell through-hole 4 during mounting and dismounting, as will be described in what follows.

Turning now to FIGS. 3A-F, a method for mounting a liner element 10 to a mill shell 2 using the already described system will be described in detail.

In a first step, one or more fastening bolts 130 (in the example embodiment: three fastening bolts 130) are inserted into associated liner element through-holes 16 of the liner element 10 from the front side 14 thereof. Then, associated liner interface guide elements 110 are attached to each of the fastening bolts 130. As already explained, this will lock the fastening bolts 130 and the liner interface guide elements 110 to their respective liner element through-holes 16 as a result from the relative cross-sectional dimensions discussed earlier. Each liner interface guide element 110 protrude out from the back side 12 of the liner element 10 to define an associated guide portion 112.

Figure 3A:
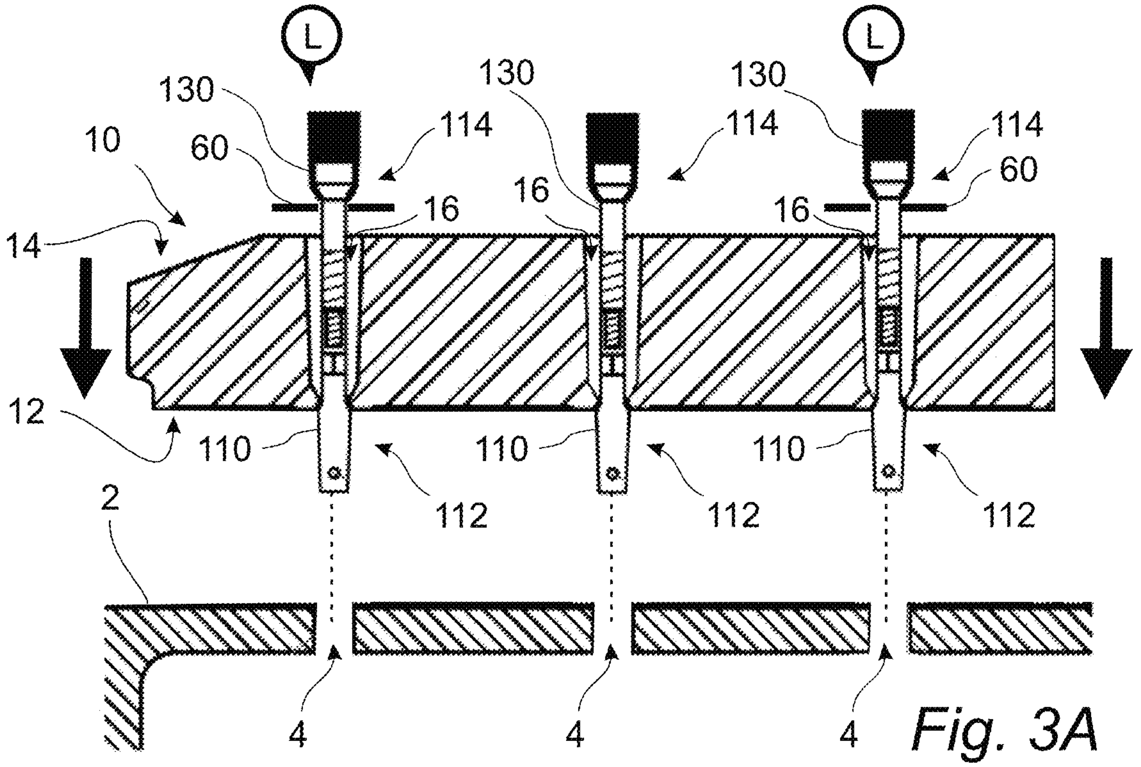

In a next step, the liner element 10 is lifted by means of a lifting tool 60 into a position with respect to the mill shell 2 at which the liner interface guide elements 110 axially coincide with associated mill shell through-holes 2. This is the position illustrated in FIG. 3A. The lifting tool 60 is typically maneuvered by a mill reline machine which is operated inside the mill. A lifting tool may be configured to lift the liner elements in different ways. One alternative is to use dedicated lifting points (not shown) available on the liner elements 10. Such dedicated lifting points are well known in the art and will not be further described herein. Another, preferred, alternative is to lift the liner element 10 by the bolt heads 132 using a lifting tool structured and arranged to engage with the bolt heads 132 when the bolt heads 132 are protruding out from the front side 14 of the liner element 10 (FIG. 3A). For such example embodiments of the method, the fastening bolts 130 and their associated liner interface guide elements 110 attached thereto are first arranged such that their bolt heads 132 protrudes out from the front side 14 of the liner element 10, and the liner element 10 is then lifted by engaging the lifting tool with the protruding bolt heads 132. Consequently, the bolt heads 132 for such example embodiments will act as lifting points. As readily appreciated by the person skilled in the art, it is not necessary to use all bolt heads 132 as lifting points. In the example embodiments, the outermost two bolt heads are used as lifting points, as indicated in FIG. 3 with the letter L enclosed by a circle. The lifting tool 60, which is indicated in the drawings, is an example embodiment of a lifting tool which is arranged to lift the liner element using the bolt heads as lifting points. There are many alternative ways of lifting the liner element 10 by engaging the bolt heads 132 according to the inventive concept. Therefore, the lifting tool 60 is only schematically indicated herein.

Figure 3B:
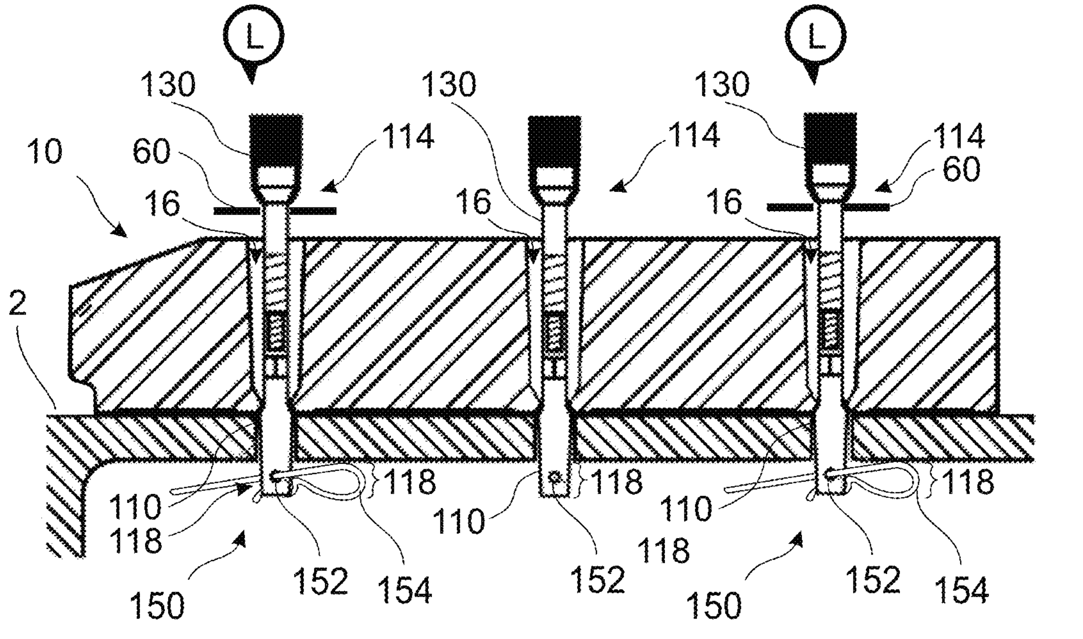

In a next step, the liner element 10 is displaced, by means of the lifting tool 60, into the mounting position at which the liner element 10 is in abutment with the mill shell 2. This is achieved by allowing the guide portions 112 of the liner interface guide elements 110 to penetrate into the mill shell through-holes 4 as indicated in FIG. 3A by the dotted lines. This way, the liner element 10 will be guided into said mounting position more or less by itself, without any assistance either from manual supervision or from dedicated e.g. sensor-based control systems on the mill reline machine in order to identify where the mill shell through holes 4 are located in relation to the liner element 10 to be mounted. Once at the mounting position, each guide portion 112 will at least partly protrude out from the mill shell 2 on the outside thereof so as to present an externally accessible engagement portion 118. This is illustrated in FIG. 3B. The engagement portion 118 is large enough to allow engagement by hand or by a tool as will be described later.

In a next optional step, locking means 150 are activated for temporarily locking the liner element 10 to the mill shell 2. The locking means 150 thus provides an engagement between the engagement portions 118 and the mill shell 2 prior to (permanently) securing the liner element 10 using said associated fasteners 140. The locking means 150 allows to temporarily lock the liner element 10 with respect to the mill shell 2 may be advantageous as it may prevent the liner element 10 from accidentally falling down during mounting thereof. The locking means 150 may thus provide an extra security during the mounting process. However, as can be deduced from analysing the relative geometry of the liner interface guide elements 110 and their associated fastening bolts 130 in relation to the liner element 10 and the mill shell 2 in FIG. 3B, the locking engagement achieved by the locking means 150 should not be construed as a fixed attachment which forces the liner element 10 to stay in the mounting position at all times. Clearly, the liner element 10 may in principal leave the mounting position to be displaced a certain distance into the interior of the mill, until, being prevented from further displacement by the locking means 150. Therefore, it is preferred that the liner element 10 is held firmly in position against the mill shell 2 by the mill reline machine until the liner element 10 has been secured to the mill shell 2 by at least one fastening bolt 130 and fastener 140.

As illustrated in FIG. 3B. the locking means 150 may be defined by a locking through-hole 152 formed in each engagement portion 118, and an associated locking element 154 arranged to be received in said locking through-hole 152. This is illustrated for the example embodiment, and FIG. 3B clearly illustrates how the locking elements 154 are inserted into the locking holes 152 on the outermost two liner interface guide elements 110.

Figure 3C:
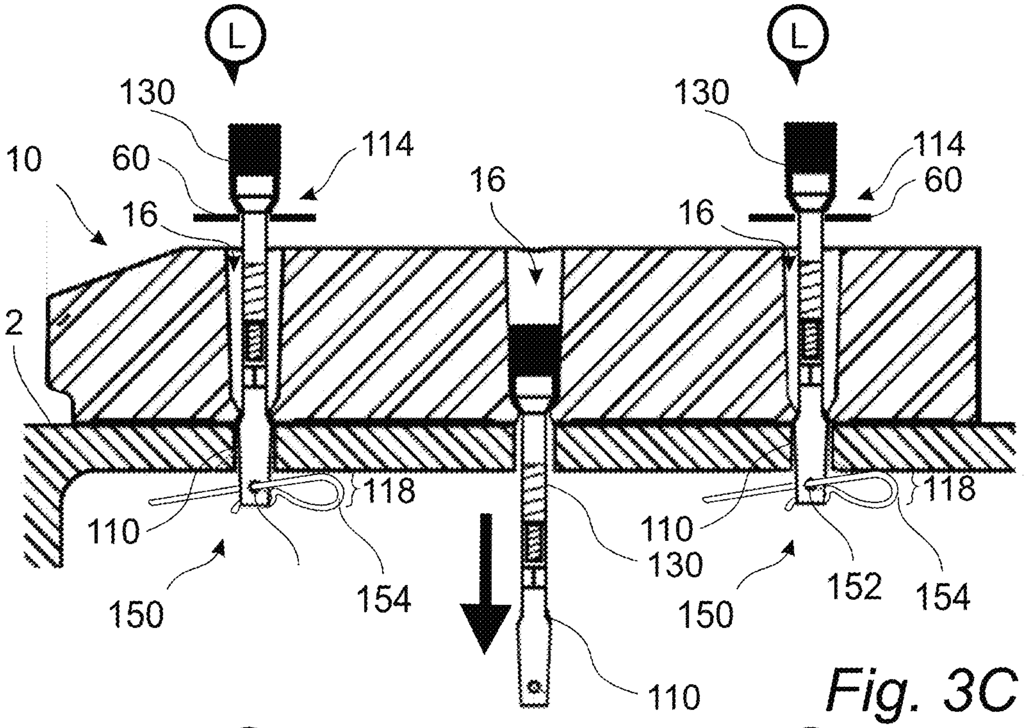

In a next step, each liner interface guide element 110 and its associated fastening bolt 130 are displaced with respect to the liner element 10 to a fastening position at which the bolt head 132 engages with the liner element 10. This step is illustrated in FIG. 3C for the middle liner interface guide element 110. Once in the fastening position, the liner interface guide elements 110 are removed from their associated fastening bolts 130. For the example embodiment, this is achieved by rotating the liner interface guide element 110 with respect to the liner element 10 e.g. using a wrench tool or spanner for engaging the tool-connecting portion 119 so as to unscrew the liner interface guide element 110 from its associated fastening bolt 130. The asymmetric cross section of the bolt head 152 which is structured and arranged to fit into the complementary shaped liner element through-hole 16 effectively prevents the fastening bolt 130 from rotating with the liner interface guide element 110.

Figure 3D:
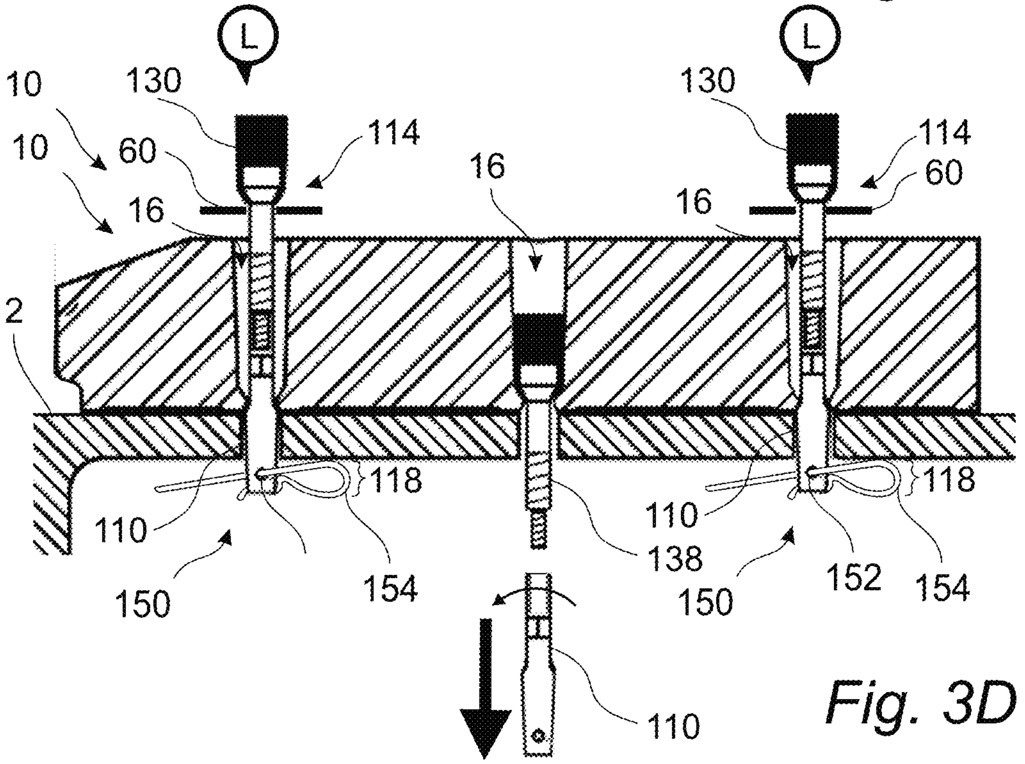
Figure 3E:
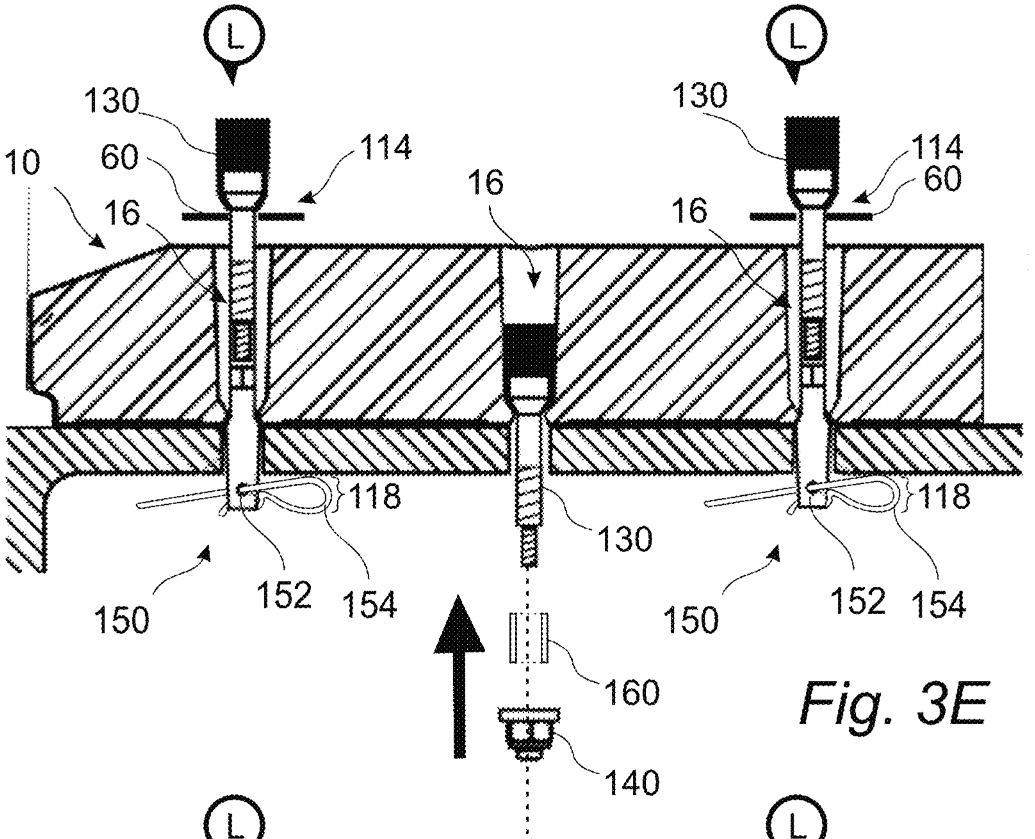
Figure 3F:
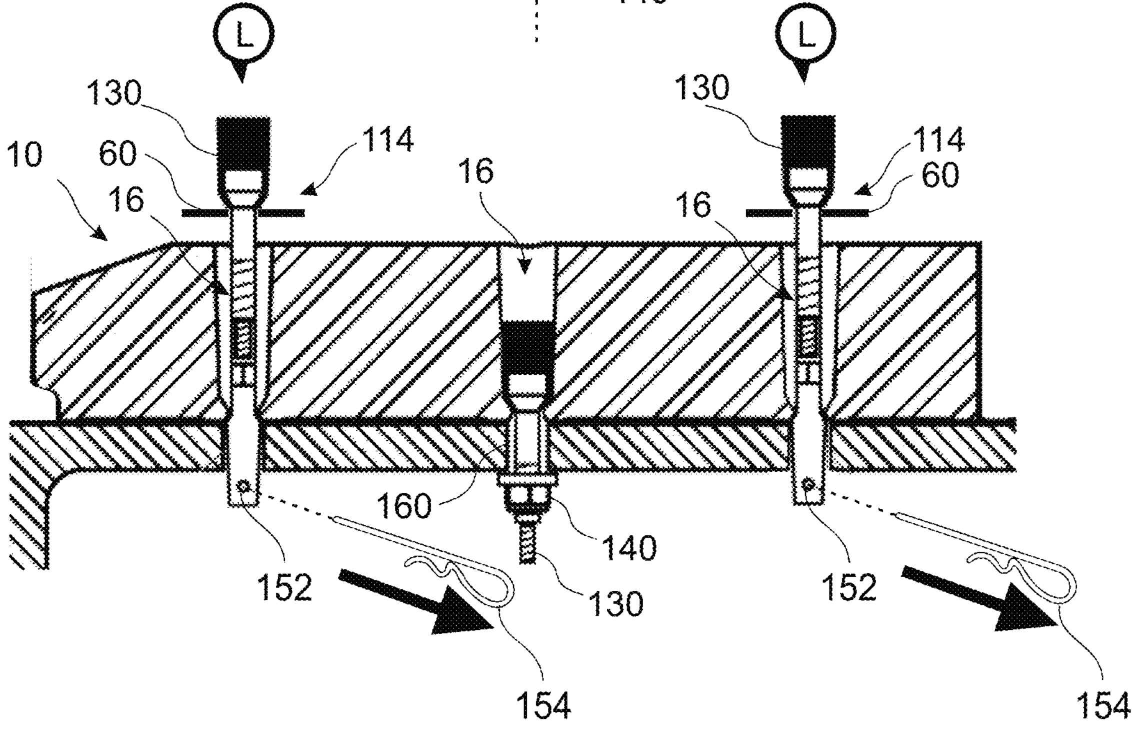

Once the liner interface guide element 110 has been removed from the fastening bolt 130, its fastener attachment portion 138 will be revealed, as illustrated in FIG. 3D. The next step will be to secure the fastening bolt 130 from outside the mill shell 2 using an associated fastener 140. This is illustrated in FIGS. 3E and F. Preferably, a collar 160 is first disposed around the bolt body 134 of the fastening bolt 130 inside the mill shell through-hole 2. This may prevent unnecessary bolt movement which may occur as the cross-sectional dimension D4 of the mill shell through-hole 4 is larger than the optimum dimension for the bolt body 134.

As readily appreciated by the person skilled in the art it is not essential that the number of liner interface guide elements 110 and fastening bolts 130 are equal. To fasten a liner element to a mill shell, two, four or even more fastening bolts 130 may be needed dependent on the liner element dimensions, the dimensions of the fastening bolts, and the physical requirements for the mill. However, for guiding a liner element to a mounting position on the mill shell, it may suffice with only one liner interface guide element 110. However, two liner interface guide elements 110 are preferred to provide better stability during the lift procedure when using the bolt heads as lifting points, as well as for providing more accurate guiding of the liner element towards the mounting position. For embodiments of the inventive concept where the liner element 10 is lifted by means of the bolt heads 132 of the fastening bolts 130, it is essential that those fastening bolts 130 that serves as lifting points are all attached to associated liner interface guide elements 110, or to any other element having a larger cross-sectional dimension than the minimum cross-sectional dimension D3 of the waist portion 18 of the liner element through-hole 16, so as to prevent the fastening bolt 130 from escaping said liner element through-hole 16. It is however preferred to attach liner interface guide elements 110 to all fastening bolts 130, as it reduces the risk that a fastening bolt 130 accidentally falls out from its liner element through-hole 16 during the mounting process.

As readily appreciated by the person skilled in the art, the same basic procedure may be used when removing a worn-out liner element from the mill, although in reverse. First, one or more fasteners 140, here illustrated as fastening nuts 140) are removed from their associated fastening bolts 130. Typically, at least one fastener 140 is left in place starting with removal of the other ones. This is especially preferred for embodiments where the mill reline machine are to lift the liner element 10 by the bolt heads 132, as there may for those embodiments be no other way to engage the lifting tool 60 of the mill reline machine with the liner element 10 prior to unfastening at least one of the fasteners 140. Engaging the lifting tool 60 with the liner element prior to finishing the unmounting process is preferred as it reduces the risk that the liner element 10 falls down into the mill prior to being properly engaged by the lifting tool 60. One or more liner interface guide elements 110 are then attached to the unsecured fastening bolts. Optionally, locking means 150 are activated to temporarily lock the liner element 10 to the mill shell 2. At least one fastening bolt 130 having an attached liner interface guide element 110 is then displaced, typically by using a bolt hammer, such that the bolt head 132 protrudes out from the front side 14 of the liner element 10 to define lifting points for the lifting tool 60. The mill reline machine can then be operated to manoeuvre the lifting tool 60 to engage with lifting points of the at least one fastening bolt 130. Alternatively, the mill reline machine can instead be operated to manoeuvre the lifting tool 60 to engage with alternative lifting points on the liner element, e.g. of conventional type. Once the liner element 10 is held firmly in position against the mill shell 2 by the mill reline machine, the remaining fasteners 140 may be removed. Optionally, associated liner interface guide elements 110 may be attached to the last fastening bolts 130. Finally, when all fasteners 140 have been removed, the mill reline machine may manoeuvre the lifting tool 60 to remove the liner element from the mill shell 2.

The person skilled in the art realizes that the present disclosure by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims.

The invention claimed is:

1. A method for mounting a liner element to a mill shell of a mill, wherein when the liner element is mounted on the mill shell, the liner element having a back side arranged to face the mill shell when mounted, and a front side arranged to face an interior of the mill, the method comprising:

a) inserting one or more fastening bolts into an associated liner element through hole of the liner element from the front side thereof, each of the one or more fastening bolts having a bolt head and a bolt body extending out from the bolt head;

b) to each of the one or more fastening bolts, attaching an associated liner interface guide element having a locking portion with a cross-sectional dimension being larger than a cross-sectional dimension of the bolt body, such that the associated liner interface guide element locks each of the one or more fastening bolts to the liner element and protrude out from the back side of the liner element to define a guide portion;

c) lifting by means of a lifting tool the liner element into a position with respect to the mill shell at which the associated liner interface guide elements axially coincides with one or more associated mill shell through-holes;

d) displacing by means of the lifting tool the liner element into a mounting position at which the liner element is in abutment with the mill shell by allowing the guide portions to penetrate into said one or more associated mill shell through-holes, thereby guiding the liner element into said mounting position, and at the mounting position the guide portion at least partly protrude out from the mill shell to an outside the mill shell thereof so as to present an externally accessible engagement portion;

e) displacing, by engaging the externally accessible engagement portion, each of the one or more fastening bolts and the associated liner interface guide element with respect to the liner element to a fastening position at which the bolt head engages with the liner element;

f) removing each of the liner interface guide elements from its associated fastening bolt; and g) securing each of the one or more fastening bolts from outside the mill shell using an associated fastener.

2. The method according to claim 1, further comprising arranging each of the one or more fastening bolts and the associated liner interface guide element attached thereto such that the bolt head protrudes out from the front side of the liner element to define a lifting portions, and lifting the liner element by engaging the lifting tool with the lifting portions.

3. The method according to claim 1, further comprising temporarily locking the liner element to the mill shell by activating locking means, wherein the locking means provide an engagement between the externally accessible engagement portion and the mill shell prior to securing the liner element using the associated fastener.

* * * * *